US008849899B1

(12) United States Patent
L'Heureux et al.

(10) Patent No.: US 8,849,899 B1
(45) Date of Patent: Sep. 30, 2014

(54) ACCELERATED DELIVERY OF MEDIA CONTENT VIA PEER CACHING

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 80 days.

(21) Appl. No.: 13/017,022

(22) Filed: Jan. 30, 2011

(51) Int. Cl.
G06F 15/16 (2006.01)
H04L 29/08 (2006.01)

(52) U.S. Cl.
CPC ..................................... *H04L 29/08* (2013.01)
USPC ......................................... 709/203; 709/225

(58) Field of Classification Search
None
See application file for complete search history.

(56) References Cited

U.S. PATENT DOCUMENTS

| | | | | |
|---|---|---|---|---|
| 6,834,297 | B1* | 12/2004 | Peiffer et al. | 709/219 |
| 7,324,473 | B2* | 1/2008 | Corneille et al. | 370/328 |
| 7,644,108 | B1* | 1/2010 | Malmskog | 711/118 |
| 2006/0206609 | A1* | 9/2006 | Ganesan et al. | 709/226 |
| 2009/0006594 | A1* | 1/2009 | Eldar et al. | 709/223 |
| 2010/0023582 | A1* | 1/2010 | Pedersen et al. | 709/203 |
| 2011/0087733 | A1* | 4/2011 | Shribman et al. | 709/204 |
| 2011/0153937 | A1* | 6/2011 | Annamalaisami et al. | 711/118 |
| 2012/0059934 | A1* | 3/2012 | Rafiq et al. | 709/225 |

OTHER PUBLICATIONS

Imai, Yoshiro and et al. "An Enhanced Application Gateway for some Web services to Personal Mobile Systems" 2005 IEEE Proceedings of the International Conference on Computational Intelligence for Modelling.*

* cited by examiner

*Primary Examiner* — Farid Homayounmehr
*Assistant Examiner* — Maung Lwin
(74) *Attorney, Agent, or Firm* — Michael J. Andri

(57) ABSTRACT

An example method includes monitoring client devices to identify a subset of client devices actively connected to an internet gateway server, and maintaining a record of media data chunks cached at each client device of the subset of client devices. The method includes receiving a request from a first client device for a media data item stored at a media server device, and determining that a first target portion of the media data item is cached at a second client device actively connected to the internet gateway server. The method includes instructing the first client device to establish a peer-to-peer connection with the second client device, to request, and to receive the first target portion of the media data item from the second client device. The method includes retrieving and sending the remainder of the media data item to the first client device.

12 Claims, 6 Drawing Sheets

| CLIENT IDENTIFIER | MEDIA IDENTIFIER | MEDIA DATA CHUNK IDENTIFIER |
|---|---|---|
| CLIENT ABC | MEDIA UVW | BYTES 1 – 1024 |
| | MEDIA XYZ | BYTES 1025 – 2048 |
| CLIENT DEF | MEDIA UVW | BYTES 1025 – 2048 |
| | MEDIA XYZ | BYTES 2049 – 3072 |
| CLIENT GHI | MEDIA UVW | BYTES 1 – 1024 |
| | MEDIA XYZ | BYTES 1 – 1024 |
| CLIENT JKL | MEDIA UVW | BYTES 2049 – 3072 |

FIG. 8

ACCELERATED DELIVERY OF MEDIA CONTENT VIA PEER CACHING

BACKGROUND

When downloading or streaming media from a remote server, users often experience delay before the presentation begins. A connection must be established between the user's device and a remote server, and the media must be downloaded and buffered a suitable amount before playback may begin. Network connection speed, latency, and congestion, as well as server delay, can contribute to the delay the user experiences. Frustrated with such delay, a user may navigate to a different media source, or may abandon the media viewing effort all together. This inhibits the widespread adoption of on-demand internet based media delivery methods, since some users may tend to prefer the immediate ability to tune in different media programs via a cable television tuner.

SUMMARY

A network communications system and method are disclosed. The network communications method may include establishing client-side connections between an internet gateway server and a plurality of client devices via a client-side access network, and enabling communications between each of the client devices and corresponding server devices via the client-side access network, the internet gateway server, and a server-side wide area network. The method further includes monitoring the client devices to identify a subset of the client devices actively connected to the internet gateway server via the client-side access network, and maintaining a record of media data chunks cached at each client device of the subset of client devices actively connected to the internet gateway server.

The method may further include receiving a request from a first client device of the subset of client devices actively connected to the internet gateway server for a media data item stored at a media server device connected or connectable to the internet gateway server via the server-side wide area network. The method further includes determining that a first target portion of the media data item is cached at a second client device of the subset of client devices actively connected to the internet gateway server based on the record, and determining that a second target portion of the media data item is cached at a third client device of the subset of client devices actively connected to the internet gateway server based on the record.

Responsive to the request, the method further includes instructing the first client device to establish corresponding peer-to-peer connections with each of the second and third client devices, to request, and to receive the first and second target portions of the media data item from the second and third client devices, respectively. The method further includes initiating presentation of the first and second target portions of the media data item at the first client device. The method further includes retrieving a remainder of the media data item, sending the remainder of the media data item to the first client device, and initiating presentation of the remainder of the media data item.

Claimed subject matter, however, is not limited by this summary as other implementations may be disclosed by the following written description and associated drawings.

BRIEF DESCRIPTION OF DRAWINGS

FIG. 8 is a diagram depicting an example cache table according to one disclosed embodiment.

DETAILED DESCRIPTION

Figure 1:
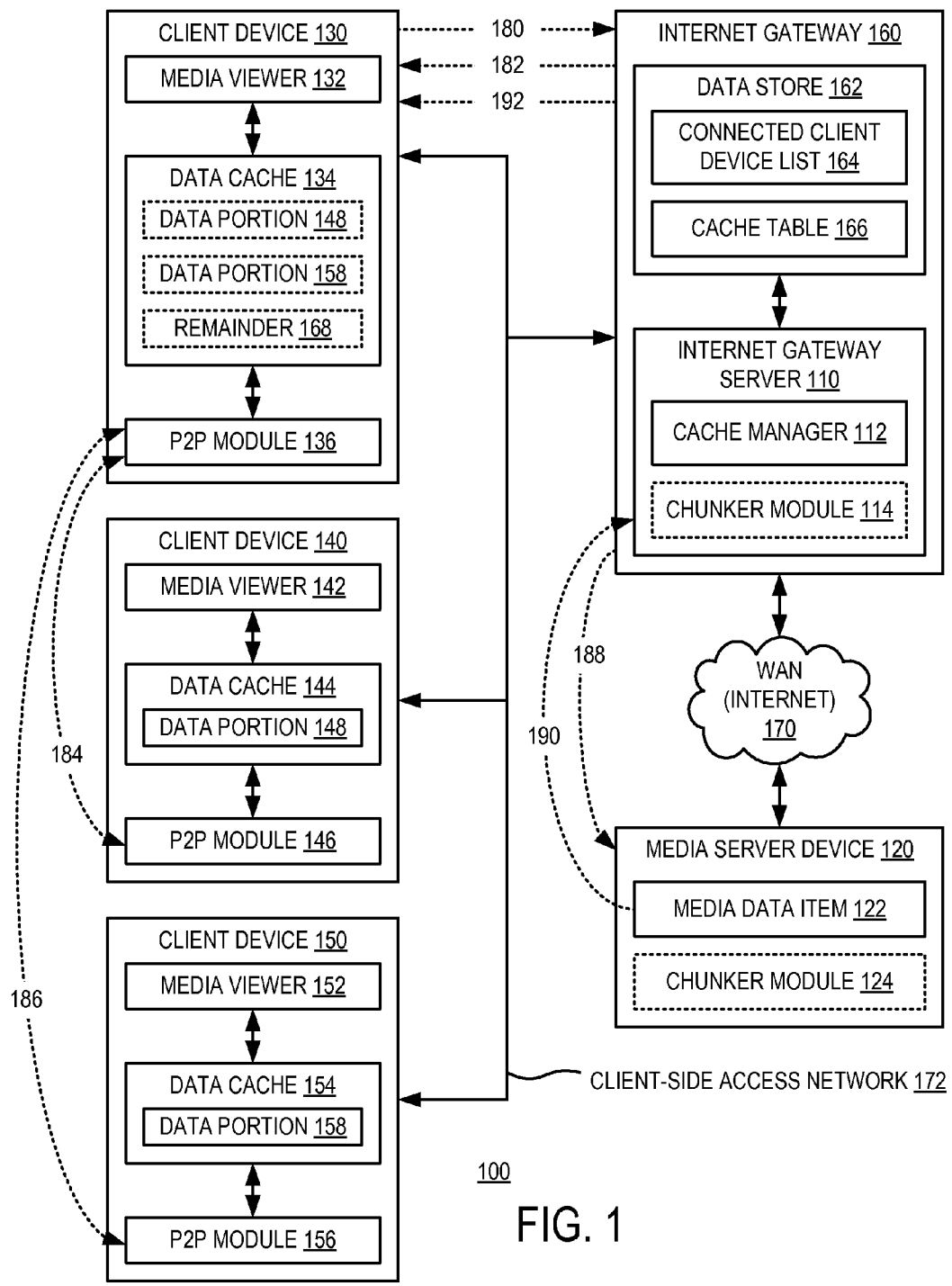
FIG. 1 is a schematic diagram depicting an example network communications system according to one disclosed embodiment.

FIG. 1 is a schematic diagram depicting an example network communications system 100 according to one disclosed embodiment. Network communications system includes a number of computing devices, including: an internet gateway server 110, one or more server devices such as media server device 120, a plurality of client devices such as first client device 130, second client device 140, and third client device 150. These computing devices may comprise a processor, memory, and/or mass storage. Instructions stored in memory or mass storage may be executed by the processor to perform one or more of the methods, processes, or functions described herein.

Internet gateway server 110 may include one or more of a cache manager 112 to monitor and identify media data chunks cached at each client device, and a chunker module 114 to break apart, or chunk, a media data item into two or more constituent media data subunits, referred to as chunks. Cache manager 112 and chunker module 114 may be implemented as instructions stored in memory or mass storage executable by a processor of internet gateway server 110. However, chunker module 114 may instead reside at media server device 120 as chunker module 124 in other implementations. In at least some implementations, internet gateway server 110 may reside at or may comprise a component of an internet gateway 160. Internet gateway 160 may further include a data store 162. Data store 162 may include a connected client device list 164 indicating a list of client devices actively connected to the internet gateway server, and a cache table 166 indicating media data chunks cached at each client device actively connected to the internet gateway server. The contents of connected client device list 164 and cache table 166 are described in greater detail with reference to FIG. 8.

Media server device 120 may include one or more of media data item 122 (among other media data items), and chunker module 124 to chunk a media data item into two or more media data chunks. Chunker module 124 may be implemented as instructions stored in memory or mass storage executable by a processor of media server device 120. Typically, the chunker module is positioned either at the media server device 120 as chunker module 124, or at the internet gateway server 110 as chunker module 114, as previously discussed, since the media data need only be chunked once by a module in either location. Alternatively, both chunker modules 114, 124 may be provided, to provide flexibility in the location of chunking. Internet gateway server 110 may communicate with media server device 120 via server-side wide area network (WAN) 170. As one example, server-side WAN 170 may comprise the Internet or a portion thereof. For this reason, the internet gateway server may alternatively referred to as a WAN gateway server, but throughout this description will be referred to as an internet gateway server for ease of reference.

First client device 130 (also referred to herein as a requesting client device) may include a media viewer 132 to enable a user to view, browse, or control presentation of media data items, a data cache 134, and a peer-to-peer module 136 to facilitate request and retrieval of media data from other client devices over peer-to-peer connections. Media viewer 132 and peer-to-peer module 136 may be implemented as instructions stored in memory or mass storage executable by a processor of first client device 130. Media viewer 132 may be configured to present media data items, for example, via a graphical display and/or audio speaker of first client device 130. Data cache 134 may reside at memory or mass storage of first client device 130, and may be configured to cache media data items or portions thereof (e.g., one or more media data chunks of a media data item). Second client device 140 and third client device 150 may be functionally identical to first client device 130. For example, second client device 140 may include media viewer 142, data cache 144, and peer-to-peer module 146. Third client device 150 may include media viewer 152, data cache 154, and peer-to-peer module 156. In at least some implementations, client devices 130, 140, 150, etc., may comprise one or more of an internet enabled mobile telephone, tablet computing device, personal computer, laptop computing device, desktop computing device, internet enabled television, cable television receiver, satellite television receiver, digital video recorder, a component of an electronic device, or other suitable computing device.

As one example, internet gateway server 110 may be positioned at a mobile broadband access point, and client-side access network 172 may be a mobile broadband wireless access network. As another example, internet gateway server 110 may be positioned at a cable network broadband access point of a cable operator, and client-side access network 172 may be a cable broadband wireless access network. As yet another example, internet gateway server 110 may be positioned at a public switched telephone network, and client-side access network 172 may be a leased line access network, dial-up access network, or asynchronous digital subscriber line access network.

Internet gateway server 110 is configured to establish client-side connections between internet gateway server 110 and the plurality of client devices 130, 140, and 150 via a client-side access network 172. Internet gateway server 110 is configured to enable communications between each of the client devices and corresponding server devices via client-side access network 172, internet gateway server 110, and server-side WAN 170. As one example, second client device 140 may request and receive a media data item 122 or portion thereof from media data stored at media server device 120 via internet gateway server 110. For example, second client device 140 is shown with a cached first target portion 148 comprising one or more media data chunks that were received from media server device 120. A user may operate media viewer 142 to present media data item 122, including at least first target portion 148.

Internet gateway server 110 is further configured to monitor the plurality of client devices to identify a subset of the client devices actively connected to internet gateway server 110 via client-side access network 172. In at least some implementations, cache manager 112 of internet gateway server 110 may update connected client device list 164 in response to client devices connecting or disconnecting from internet gateway server 110 to provide an indication of actively connected client devices. Internet gateway server 110 is further configured to maintain a record of media data chunks cached at each client device of the subset of client devices actively connected to the internet gateway server. For example, cache manager 112 of internet gateway server 110 may update cache table 166 in response to media data chunks being cached or deleted (e.g., over written or made available for over-writing) at client devices to maintain a record of media data chunks stored at each client device. In at least some implementations, a media data item may be cached in a distributed cache across a plurality of client devices. Cache manager 112 may manage, control, and track (e.g., via cache table 166) caching of the media data chunks of the media data item across the plurality of client devices in any suitable manner.

Internet gateway server 110 is further configured to receive a request 180 from first client device 130 (i.e., a requesting client device) of the subset of client devices actively connected to internet gateway server 110, for a media data item 122 stored at media server device 120 connected or connectable to internet gateway server 110 via server-side WAN 170. Cache manager 112 of internet gateway server 110 is configured to determine that first target portion 148 of media data item 122 is cached at second client device 140 of the subset of client devices actively connected to internet gateway server 110 based on the record maintained, for example, at cache table 166. As one example, first target portion 148 may correspond to a seek location (e.g., playback point) of media data item 122. For example, first target portion 148 may comprise at least one media data chunk beginning at and following from the seek location. Cache manager 112 of internet gateway server 110 may be further configured to determine that a second target portion 158 of media data item 122 is cached at third client device 150 of the subset of client devices actively connected to the internet gateway server based on the record maintained, for example, at cache table 166. For example, second target portion 158 may comprise at least one media data chunk beginning at the end of first target portion 148 corresponding to a subsequent location after the seek location of first media data item 122. Greater numbers of target portions of a media data item may be identified and retrieved for a requesting client device based on the record of media data chunks cached at each client device, as indicated by cache table 166.

Cache manager 112 of internet gateway server 110 is further configured to, responsive to request 180, instruct first client device 130 (e.g., via instruction message 182) to establish corresponding peer-to-peer connections 184, 186 with each of second client device 140 and third client device 150, to request, and to receive first target portion 148 and second target portion 158 of media data item 122 from second client device 140 and third client device 150, respectively. For example, peer-to-peer module 136 of first client device 130 may be configured to receive instruction message 182 from internet gateway server 110. Instruction message 182 may indicate one or more network locations of one or more client devices from which the one or more target portions of the media data item may be obtained.

In at least some implementations, peer-to-peer connections may be established between respective peer-to-peer modules of the client devices. For example, peer-to-peer module 136 of first client device 130 may establish one or more peer-to-peer connections (e.g., connections 184, 186) with peer-to-peer modules of other client devices (e.g., second client device 140 and third client device 150), in response to receiving instruction message 182. First client device 130 may request and receive first target portion 148 from second client device 140 via peer-to-peer connection 184 over client-side access network 172. First client device 130 may request and receive second target portion 158 from third client device 150 via peer-to-peer connection 186 over client-side access network 172. The first and second target portions 148, 158 may be cached at data cache 134 by first client device 130. Media viewer 132 may initiate presentation of first and second target portions 148, 158 upon receiving them from second and third client devices 140 and 150.

In at least some implementations, chunker module 114 of internet gateway server 110 is configured to retrieve a remainder 168 of media data item 122 not obtained by first client device 130 from other client devices. As one example, internet gateway server 110 may retrieve remainder 168 of media data item 122 by retrieving the entire media data item 122 from media server device 120, chunk or otherwise divide media data item 122 into a plurality of media data chunks at chunker module 114, and identify those chunks that comprise remainder 168 of media data item 122. Internet gateway server 110 is further configured to send a reply message 192 that includes those media data chunks comprising remainder 168 to first client device 130, so that first client device 130 may obtain the entirety of media data item 122. As another example, cache manager 112 is configured to retrieve remainder 168 of media data item 122 from media server device 120, wherein chunker module 124 chunks or otherwise divides media data item 122 at media server device 120. Cache manager 112 of internet gateway server 110 is configured to send a request 188 for a remainder 168 of media data item 122 from media server device 120, and receive a reply 190 including a remainder 168 of media data item 122 from media server device 120. Cache manager 112 is configured to send a reply message 192 including a remainder 168 to first client device 130.

While the above example has been described in terms of first client device 130 obtaining first and second target portions 148, 158 from respective second and third client devices 140, 150, with remainder 168 being obtained from internet gateway server 110, other content delivery scenarios may be supported. For example, a first target portion may be instead obtained by first client device 130 from internet gateway server 110, a second target portion may be instead obtained from one of second and third client devices 140, 150, and a remainder may be obtained from another of second and third client device 140, 150. Accordingly, it should be understood that numerous content delivery scenarios may be implemented by internet gateway server 110, whereby one or more portions of a media data item may be obtained via one or more peer-to-peer connections.

In at least some implementations, cache manager 112 of internet gateway server 110 is configured to identify a media identifier for media data item 122 requested by first client device 130 based, at least in part, on a parameter of a URL or other resource identifier of the request. Alternatively or additionally, internet gateway server 110 is configured to identify the media data item 122 based, at least in part, on information contained in a query response 190 received from media server device 120. For example, the media identifier may comprise a media data item title, or media server device 120 may resolve the media data item title to a character string of a variable or predetermined string length to obtain the media identifier. Thus, a movie title such as "On Any Sunday" may be a media identifier, or an alphanumeric code associated with the movie title may be the media identifier, for example. The latter alternative may assign different codes to each of multiple versions of the same movie having the same title, enable the system to distinguish between such versions, for example. It will be appreciated that other suitable information may be utilized as a media identifier or may be resolved to a media identifier, for example, by media server device 120. As described in greater detail with reference to FIG. 8, cache table 166 comprising the record of media data chunks cached at each of client device of the subset of client devices actively connected to internet gateway server 110 may be organized by media identifier and a corresponding media data chunk identifier for each media data chunk, and a client identifier for each of the client devices.

In at least some implementations, cache manager 112 of internet gateway server 110 is further configured to receive a confirmation message from peer-to-peer module 136 of first client device 130 indicating that at least the first target portion 148 was successfully transferred over respective peer-to-peer connections between first client device 130 and second client device 140. A confirmation message may be sent by peer-to-peer module 136 to cache manager 112 for each target portion or media data chunk thereof that is successfully received by first client device 130. If the confirmation message for first target portion 148 is not received from the first client device within a threshold time period after instructing the first client device or if an error message is instead received, then cache manager 112 of internet gateway server 110 is further configured to retrieve first target portion 148 (e.g., from media server device 120) and send first target portion 148 to first client device 130. Alternatively, cache manager 112 is configured to instruct peer-to-peer module 136 of first client device 130 to establish corresponding peer-to-peer connections with a fourth client device (not shown), to request, and to receive first target portion 148 from the fourth client device.

In at least some implementations, cache manager 112 of internet gateway server 110, prior to determining that first target portion 148 is cached at second client device 140, is further configured to determine whether first client device 130 is authorized to receive accelerated transmission of media data, and to instruct first client device 130 to establish the corresponding peer-to-peer connections with each of the second and third client devices 140, 150 only if first client device 130 is authorized to receive accelerated transmission of media data. Authorization of accelerated transmission of media data is described in greater detail with reference to FIG. 5.

In at least some implementations, cache manager 112 of internet gateway server 110 is further configured to, prior to receiving request 180 from first client device 130, preload a third portion of media data item 122 at first client device 130 by sending a third portion of the media data item to first client device via client-side access network 172. The third portion of media data item 122 may correspond to a beginning portion of media data item 122, and first and second target portions 148, 158 may correspond to subsequent portions of media data item 122. In at least some implementations, internet gateway server 110 and/or media server device 120 monitor which media data items users are viewing or playing at respective client devices. Beginning portions of some (e.g., top 100 most viewed) or all of the media data items available to the client devices may be preloaded onto some or all of the client devices before actually receiving a request for the media data item. The media viewer module of a client device may be configured to check the data cache at the client device prior to requesting the media data item, and initiate presentation of the preloaded beginning portion of the media data item from the data cache even before receiving other portions of the media data item over the network. In this way, viewing of a media data item can commence without peer-to-peer connections being established and without regards to network latency.

The above described cache manager 112 and/or chunker module 114 of internet gateway server 110, in cooperation with peer-to-peer modules of client devices may further support the following methods, processes, or functions described with reference to FIGS. 2-6.

Figure 2:
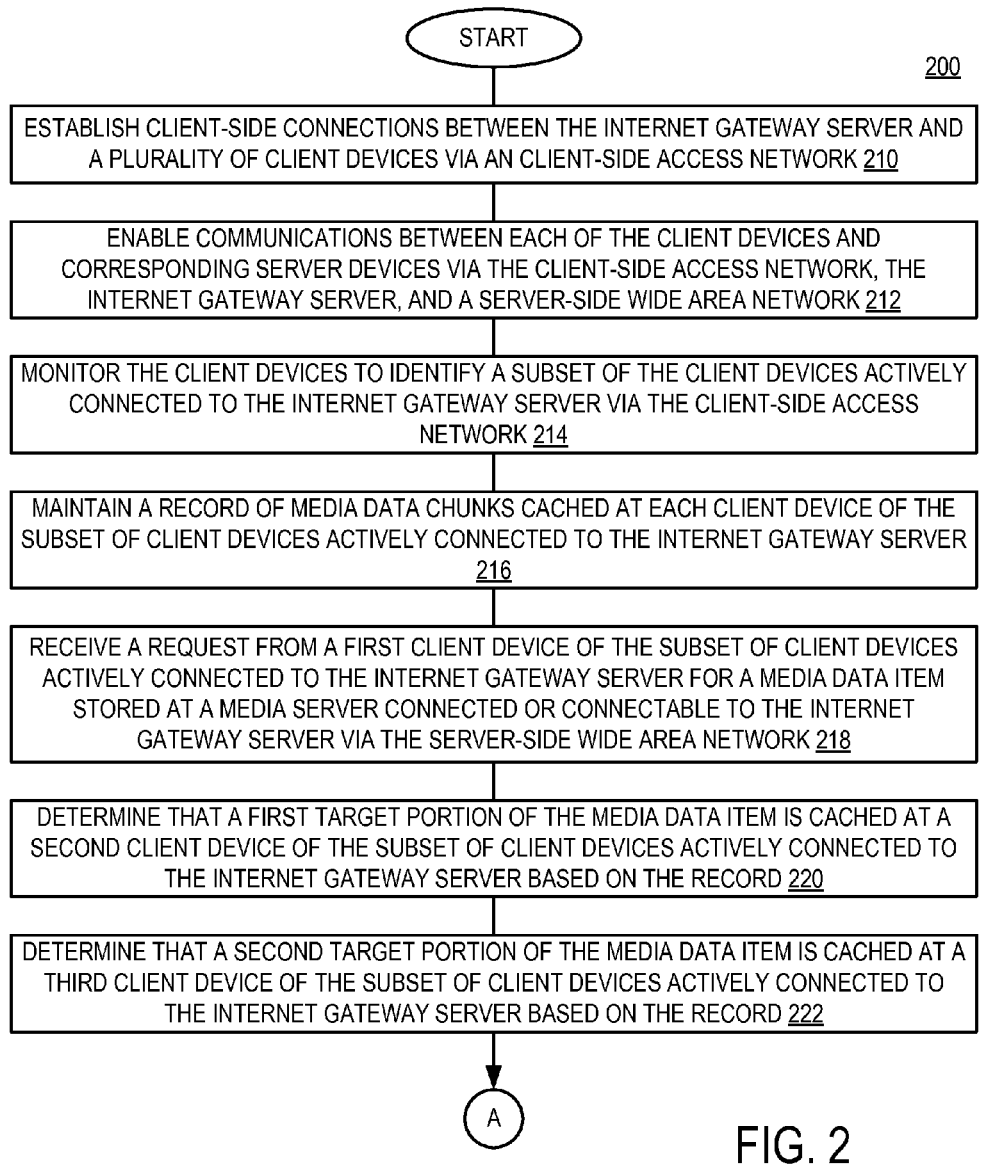
FIGS. 2 and 3 are flow diagrams depicting an example network communications method according to one disclosed embodiment.
Figure 3:
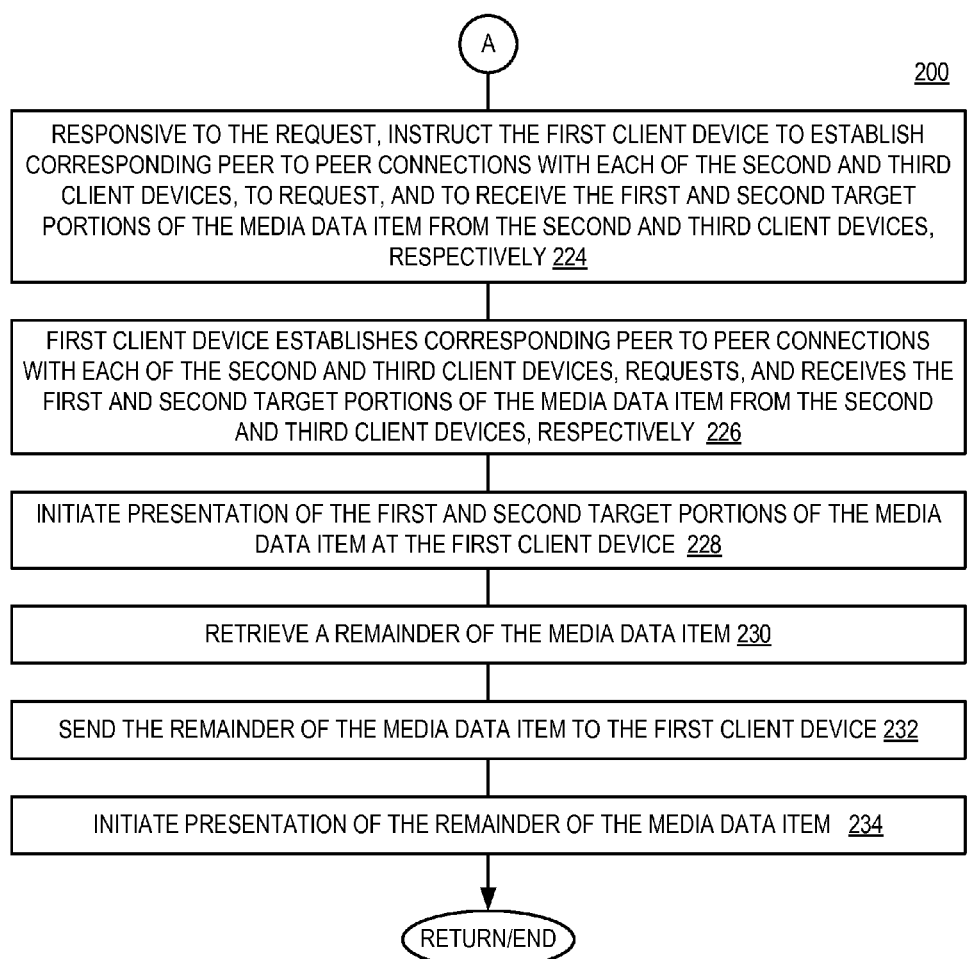

FIGS. 2 and 3 are flow diagrams depicting an example network communications method 200 according to one disclosed embodiment. Method 200 may be performed, a least in part, by an internet gateway server or other suitable network device, such as previously described internet gateway server 110, for example.

At 210, the method includes establishing client-side connections between the internet gateway server and a plurality of client devices via a client-side access network. As one example, the internet gateway server may establish a TCP connection with a client device in response to the client device initiating a three-way handshake procedure with the internet gateway server. At 212, the method includes enabling communications between each of the client devices and corresponding server devices via the client-side access network, the internet gateway server, and a server-side wide area network. As one example, the internet gateway server may enable communications between a client device and a media server device via the client-side access network connected to the client device, the internet gateway device, and server-side wide area network connected to the media server device.

At 214, the method includes monitoring the client devices to identify a subset of the client devices actively connected to the internet gateway server via the client-side access network. For example, the internet gateway server may update a connected client device list in response to a client device connecting to or disconnecting from the internet gateway server to maintain a list of client devices actively connected to the internet gateway server at a given time. As previously described, each client device may be identified and distinguished from each other by a client identifier.

At 216, the method includes maintaining a record of media data chunks cached at each client device of the plurality of client devices, including at least each client device of the subset of client devices actively connected to the internet gateway server. As one example, the internet gateway server may maintain a record for a given client device that spans multiple sessions to include one or more media data chunks of one or more media data items that were previously received by that client device. In at least some implementations, the internet gateway device may identify the cached media data chunks at a client device based on requests received from the client device for the media data chunks, responses sent to the client device for the media data chunks, or previous commands sent to the client device to control retention of the cached media data chunks by the client device. Alternatively or additionally, the internet gateway server may identify the cached media data chunks based on a response from the client device for a request made by the internet gateway server for a record of media data chunks cached at the client device. In at least some implementations, a media data chunk of a media data item may be identified by a media data chunk identifier (e.g., a byte range indicator) in addition to a media identifier of the media data item. For example, the record of media data chunks cached at each client device of the subset of client devices (e.g., the cache table) may be organized by the media identifier and a corresponding media data chunk identifier for each media data chunk, and a client identifier for each of the client devices. As a non-limiting example, a given media data chunk of a given media data item cached at a given client device may be identified as [byte range=1025-2048 of media data item XYZ cached at client device ABC], however other suitable identifiers may be used.

In at least some implementations, method 200 further includes identifying a media identifier for the media data item based, at least in part, on a parameter of a URL of the request for media data item. Alternatively or additionally, identifying the media identifier for the media data item based, at least in part, on a query response received from the media server device. The media identifier may be used by the internet gateway device to identify, from the cache table and/or connected client device list, one or more client devices having cached media data chunks of the media data item corresponding to the media identifier.

It will be appreciated that any suitable caching policy may be implemented at a client device to cause the client device to retain one or more cached media data chunks. For example, a client device may be configured to or instructed to retain, in a data cache at the client device, one or more predetermined or randomly selected media data chunks forming a subset of a media data item comprising a larger number of media data chunks. Regardless of the particular approach used to maintain cached media data chunks at a client device, the internet gateway server may obtain a record of the media data chunks cached at each client device.

At 218, the method includes receiving a request from a first client device of the subset of client devices actively connected to the internet gateway server for a media data item stored at a media server device connected or connectable to the internet gateway server via the server-side wide area network. At 220, the method includes determining that a first target portion of the media data item is cached at a second client device of the subset of client devices actively connected to the internet gateway server based on the record of media data chunks cached at each client device of the subset of client devices actively connected to the internet gateway server. At 222, the method includes determining that a second target portion of the media data item is cached at a third client device of the subset of client devices actively connected to the internet gateway server based on the record of media data chunks cached at each client device actively connected to the internet gateway server. In at least some implementations, the method may not be performed at 222, for example, if only a first target portion of the media data item is to be sent to the first client device via a peer-to-peer connection.

Referring to FIG. 3, at 224, the method includes, responsive to the request, instructing the first client device to establish corresponding peer-to-peer connections with each of the second and third client devices, to request, and to receive the first and second target portions of the media data item from the second and third client devices, respectively. However, the method at 224 may include instructing the first client device to establish a peer-to-peer connection with only the second client device if the second target portion of the media data item is not to be obtained by the first client device over a peer-to-peer connection to the third client device.

At 226, the first client device establishes corresponding peer-to-peer connections with each of the second and the third client devices (if utilizing the third client device), requests, and receives the first and second target portions of the media data item from the second and third client devices (if utilizing a third client device), respectively. At 228, the method includes initiating presentation of the first and second target portions of the media data item at the first client device. For example, presentation of the first target portion of the media data item may be initiated at the first client device as soon as the first target portion is received by the first client device, with presentation of the second target portion occurring after presentation of the first target portion in accordance with the logical playback order of the media data chunks of the media data item. In at least some implementations, method 200 may further include receiving a confirmation message from the first client device indicating that the first target portion and the second target portion were successfully transferred over respective peer-to-peer connections between the first client device and the second and third client devices. For example, the first client device may be configured to send a confirmation message to the internet gateway server in response to successfully receiving a target portion of the media data item from another client device.

The method may continue in this manner to enable the first client device to retrieve any suitable number of media data chunks from any suitable number of other client devices, including three or more, ten or more, one hundred or more, etc. other client devices. The number of media data chunks retrieved by the first client device from other client devices may be computed and implemented (e.g., by the internet gateway server) based on an estimation of how long it will take for the first client device to retrieve and buffer the remainder portion of the media data item from the media server device. In at least some implementations, the internet gateway server may instruct the first client device to retrieve a greater number of media data chunks from a greater number of other client devices as an estimation of how long it will take the first client device to retrieve and buffer the remainder portion increases, to thereby reduce the total amount of time for the first client device to request and receive the media data item.

At 230, the method includes the internet gateway server retrieving a remainder of the media data item. In at least some implementations, retrieving the remainder of the media data item includes requesting the remainder of the media data item from the media server device, and receiving the remainder of the media data item from the media server device. Alternatively, in at least some implementations, retrieving the remainder of the media data item at 230 includes retrieving the entire media data item from the media server device, chunking the media data item into a plurality of chunks, and identifying those chunks that comprise the remainder of the media data item. At 232, the method includes sending the remainder of the media data item to the first client device. In some examples, sending the remainder of the media data item at 232 may include sending those chunks identified by the internet gateway device comprising the remainder to the first client device. At 234, the method includes initiating presentation of the remainder of the media data item at the first client device.

In an alternative environment, the functionality of the internet gateway server described above may instead be implemented by a networking device positioned in internet gateway 160, which is configured to include the function of a transparent proxy, and which is configured to route requests for initial chunks of media data that would have otherwise been routed to the media server, instead directly to the peer client devices on which the requested chunks are cached, so that a requesting client device effectively retrieves those chunks of media data from peer client devices, rather than from the media data server. Such a gateway with transparent proxy functionality may have a speed advantage, in that it is not necessary to terminate the connections at the proxy as in a conventional proxy server. A benefit of transparency, in at least some implementations, is that the client does not need to be configured to use a proxy, and the gateway can have intelligent over-riding control as to where connections and requests go.

In such implementations, the transparent proxy may not establish HTTP-level connections with client devices. Accordingly, it will be appreciated that in such an embodiment, the method at 210 may be omitted, and the method step at 214 may instead include monitoring request and response streams between a client device and the media server, rather than monitoring client devices themselves. The method at 218 may be implemented by the transparent proxy monitoring communications between the first client device and the media server device to identify one or more of a request message for a media data item from the first client device directed to the media server device, or a response message for the request from the media server device directed to the first client device. The method at 224 may include intercepting the response message from the media server device, and modifying an object reference to a first target portion of the media data item in the response message from a network address of the media server device to a network address of a second client device to enable the first client device to establish a peer-to-peer connection with the second client device, and to enable the first client device to request and to receive the first target portion of the media data item from the second client device via the peer-to-peer connection. The method at 230 may be further implemented by the transparent proxy facilitating delivery of a remainder of the media data item to the first client device from one or more of the media server device, from a third client device via another peer-to-peer connection, or from the transparent proxy itself.

In another alternative environment, the functionality of the internet gateway server and/or transparent proxy described above may instead be implemented by one or more client devices, including a client device requesting a media data item from one or more clients and/or one or more client devices serving media data chunks to the requesting client device. For example, a client can be elected to perform at least some of the functions of the gateway server or transparent proxy described herein. Accordingly, any of the clients on the network may be configured to function as the internet gateway server or transparent proxy. As such, a client device may include one or more of the previously described cache manager and/or chunker module, for example.

Figure 4:
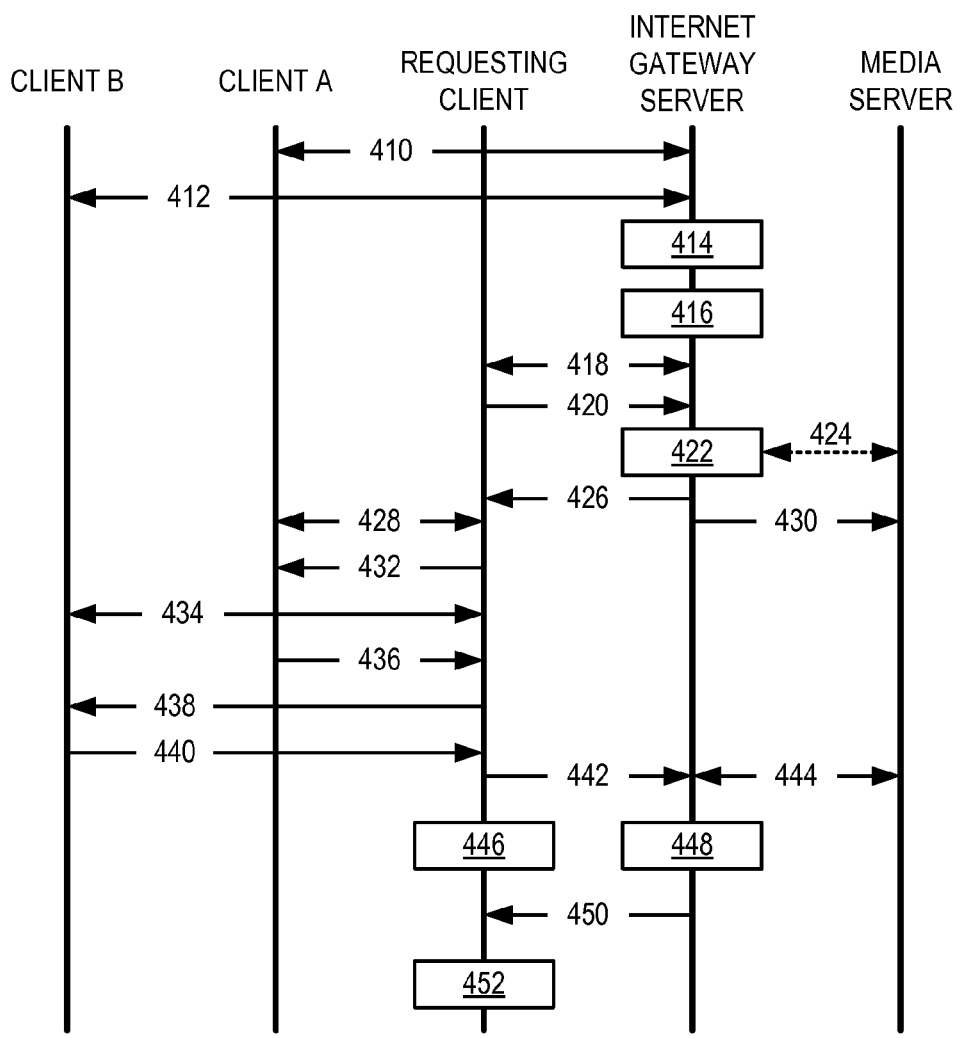
FIG. 4 is network flow diagram according to one disclosed embodiment.

FIG. 4 is a network flow diagram according to one disclosed embodiment. At 410 and 412, client devices A and B respectively establish connections with the internet gateway server, request media data, and receive media data from the internet gateway server or other suitable network location. As one example, a TCP connection or other suitable connection may be established between a client device and the internet gateway device. Portions of the media data may be cached at clients A and B as one or more media data chunks. At 414, the internet gateway server maintains a record of media data chunks cached at each client device, including client devices A and B. As one example, the record may comprise a cache table such as previously described cache table 166. At 416, the internet gateway server monitors to identify client devices, such as client devices A and B that are actively connected to the internet gateway server. As one example, the internet gateway server may maintain a connected client device list such as previously described connected client device list 164.

At 418, a requesting client device establishes a connection with the internet gateway server. The internet gateway server may update the connected client device list in response to the requesting client device connecting to the internet gateway server. At 420, the requesting client device makes a request to the internet gateway server for a media data item stored on a media server device. As one example, the request may comprise an HTTP request or other suitable application-level protocol request. At 422, the internet gateway server determines (e.g., based on the cache table and the connected client device list) if one or more target portions of the requested media data item are cached at one or more other actively connected client devices, such as client devices A and B, for example. A target portion may correspond to a seek location of the requested media data item, for example, and may comprise one or more media data chunks. At 424, the internet gateway server may request and receive a media identifier from the media server device for the requested media data item. The media identifier may be used by the internet gateway server to retrieve a list of client devices from the cache table that have cached one or more media data chunks for the media identifier.

If one or more of the target portions of the requested media data item are cached at one or more of the actively connected client devices, such as client device A and B, the internet gateway server sends a peer-to-peer data cache retrieval command to the requesting client device at 426. The peer-to-peer data cache retrieval command, in this example, instructs the requesting client device to establish corresponding peer-to-peer connections with each of client devices A and B, to request, and to receive first and second target portions of the requested media data item from client device A and B, respectively. At 428, the requesting client device establishes a peer-to-peer connection with client device A, and sends a request for a first target portion of the media data item to client device A over the peer-to-peer connection at 432. At 434, the requesting client device establishes another peer-to-peer connection with client device B, and sends a request for a second target portion of the media data item over the peer-to-peer connection at 438.

At 436 and 440, the requesting client receives the first and second target portions from clients A and B over the respective peer-to-peer connections. At 446, the requesting client device may initiate presentation of the first and/or second target portions of the media data item as soon as they are received by the requesting client device. For example, if the first target portion comprises forward encoded media, then the requesting client device may initiate playback of the first target portion before receiving the second target portion of the media data item.

At 442, the requesting client device may send a confirmation message to the internet gateway server that indicates that the first and second target portions of the media data item were successfully received by the requesting client device. In at least some implementations, the confirmation message may indicate which media data chunks of the target portions were successfully received by the requesting client device. The confirmation message may indicate missing media data chunks, for example, if the peer-to-peer connection was lost or interrupted during retrieval of the target portion.

If one or more of the target portions of the requested media data item are not cached at one or more of the actively connected client devices, or if one or more of the media data chunks were not received by the requesting client device, the internet gateway server may request the media data item, one or more target portions of the media data item, or one or more media data chunks of the media data item from the media server device at 430. The internet gateway server may serve the requested media data item to the requesting client device (not shown), for example, without instructing the requesting client device to establish peer-to-peer connections with other client devices. Alternatively or additionally, the internet gateway server may instruct the requesting client device to establish corresponding peer-to-peer connections with yet another client device, to request, and to receive one or more media data chunks from the client device.

At 444, the internet gateway server may request and receive the media data item or remainder of the media data item not requested by the requesting client device from other client devices. At 448, the internet gateway server receives the remainder of the media data item from the media server device or obtains the remainder of the media data item, for example, by chunking the media data item. To obtain the remainder, the internet gateway server may compare the media data chunks of the media data item to the media data chunks indicated by the confirmation message to have been received by the requesting client device. At 450, the internet gateway server sends the remainder of the media data item to the requesting client device, or may alternatively send an instruction to the requesting client to obtain the remainder from another client device via a peer-to-peer connection. At 452, the requesting client device initiates presentation of the remainder of the media data item.

Figure 5:
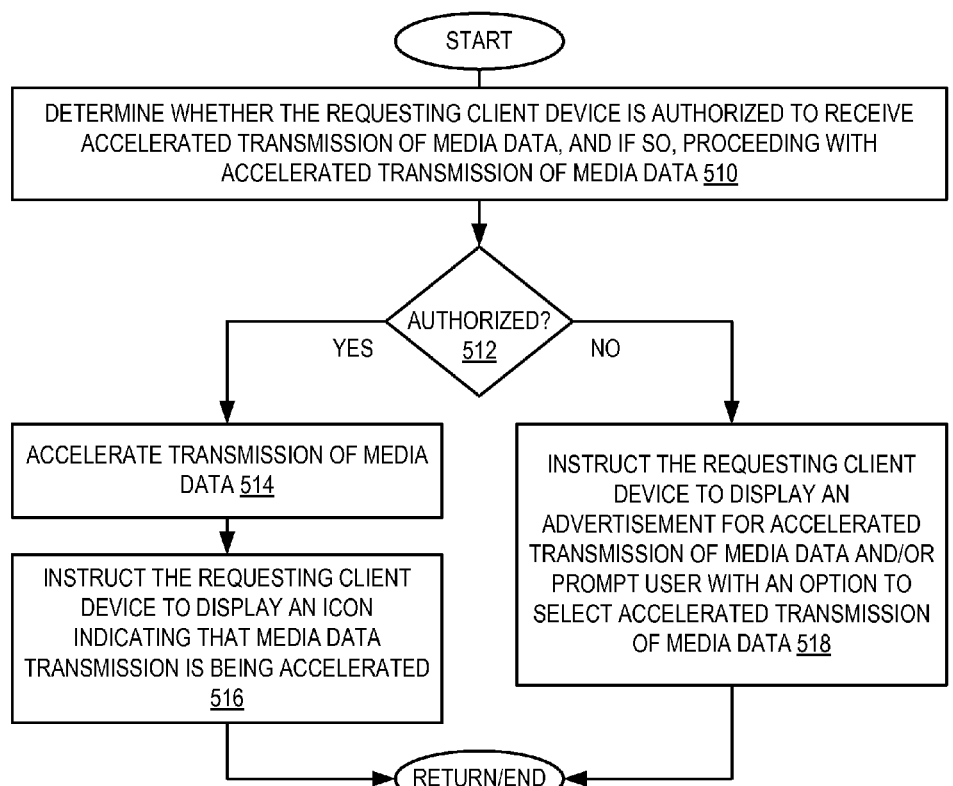
FIG. 5 is a flow diagram depicting another example network communications method according to one disclosed embodiment.

FIG. 5 is a flow diagram depicting another example network communications method 500 according to one disclosed embodiment. In at least some implementations, method 500 may be implemented with previously described method 200. For example, method 500 may be performed, at least in part, by an internet gateway server or other suitable network device, such as previously described internet gateway server 110. However, in at least some implementations, method 500 may be performed, at least in part, by a peer-to-peer module operating at a requesting client device, such as previously described peer-to-peer module 136.

At 510, the method includes determining whether a requesting client device (e.g., the previously described first client device of system 100 or method 200) is authorized to receive accelerated transmission of media data, and if so, proceeding with the accelerated transmission of media data. For example, 510 of method 500 may be applied at previously described method 200 at 218. From 512, if the requesting client device is determined to be authorized to receive the accelerated transmission of media data, the method at 514 includes accelerating the transmission of media data to the requesting client device. For example, the internet gateway server may instruct the requesting client device to request one or more target portions of a media content item from one or more other client devices via respective peer-to-peer connection as previously described by method 200 of FIGS. 2 and 3.

The method at 516 may further include instructing the requesting client device to display an icon (e.g., via a graphical display of the requesting client device) or otherwise present an indication (e.g., by audio output to provide an acceleration indicator, or other suitable output) indicating that transmission of media data is being accelerated. For example, the internet gateway server, the requesting client device, or an API thereof may rewrite HTML or data stream of the original content to insert a message that may be utilized by the requesting client device to inform the user about the added value of the accelerated transmission of media data. In at least some implementations, a peer-to-peer module operating at the requesting client device may be configured to display the icon or otherwise present an indication of the accelerated transmission of media data without necessarily receiving an instruction from an internet gateway server.

If the requesting client device is determined at 512 to be unauthorized to receive accelerated transmission of media data, the method at 518 includes instructing the requesting client device to display or otherwise present an advertisement for accelerated transmission of media data. For example, the advertisement may be displayed or otherwise presented to a user via the requesting client device before presentation of the requested media data item is initiated, or at least during a period of time when the requesting client device is waiting to receive the requested media data item from the network. In at least some implementations, the advertisement may be pre-loaded at the requesting client device (e.g., before the requesting client device requests the media data item) to enable rapid display or presentation of the advertisement while the requested media data item is being retrieved by the requesting client device.

Alternatively or additionally, the method at 518 may include instructing the requesting client device to prompt a user with an option to select accelerated transmission of media data. For example, a user may be prompted to opt-in to the accelerated transmission of media data for the current session or for subsequent sessions by paying an additional subscription fee and/or by permitting the user's client device to be utilized to cache chunks of media data that may be requested by other client devices via peer-to-peer connections. In at least some implementations, a peer-to-peer module operating at the requesting client device may be configured to display the advertisement and/or prompt the user without necessarily receiving an instruction from an internet gateway server.

Figure 6:
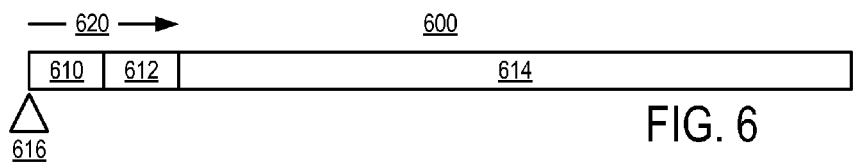
FIGS. 6 and 7 schematically depict example media data items according to one disclosed embodiment.

FIG. 6 shows an example media data item 600 comprising N bytes of data. A first target portion 610 of media data item 600 comprises X bytes of data, a second target portion 612 of media data item 600 comprises Y bytes of data, and a remainder 614 of media data item 600 comprises Z bytes of data. In this example, first and second target portions 610 and 612 each comprise at least one media data chunk, however, a target portion of a media data item may comprise two or more media data chunks in some implementations. In this example, first target portion 612 corresponds to seek location 616 of media data item 600 that is located at the beginning of the media data item. For example, first target portion 610 comprises at least one media data chunk beginning at and following from seek location 616. A direction of presentation (e.g., playback) of media data item 600 is depicted at 620. In at least some implementations, the size of all chunks is the same, and thus, the X bytes of data of first target portion 610 may be equal in size to the Y bytes of data of the second target portion 612. For example, first portion 610 and second portion 612 may each comprise a predetermined number of bytes (e.g., 1024 bytes or other suitable number of bytes). However, in some implementations, the X bytes of data of first target portion 610 may be larger or smaller than the Y bytes of data of second target portion 612. In at least some implementations, the Z bytes of data of remainder 614 may be equal to the X and Y bytes of data of first and second target portions. For example, padding bits or bytes may be added by the internet gateway or media server device to remainder 614 to increase the size of remainder 614 to a predetermined size if remainder 614 is smaller than first or second target portions. However, in some implementations, the Z bytes of remainder 614 may be larger or smaller than the X or Y bytes of first and second target portions. Typically, the remainder is much larger than the size of the chunks initially downloaded from peer client devices, but the remainder may be delivered in chunks of equal size to the initial chunks, if desired.

Figure 7:
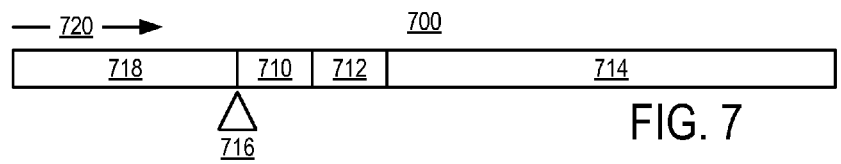

FIG. 7 shows another example media data item 700 comprising N bytes of data. In this example, a seek location 716 of media data item 700 is advanced to an intermediate location subsequent to the beginning of media data item 700. A direction of presentation (e.g., playback) of media data item 700 is depicted at 720. For example, a user may fast forward a media data item or may resume presentation of a media data item from an intermediate location via a media viewer operating at the client device. In this example, first target portion 710 and second target portion 712 are located at intermediate locations of media data item 700 corresponding to seek location 716. A remainder 714 of media data item 700 is shown subsequent to first and second target portions 710 and 712. A skipped portion 718 of media data item 700 is further shown. In at least some implementations, skipped portion 718 of media data item 700 may not be provided to a client device in scenarios where the client device requests presentation of the media data item from an intermediate seek location such as seek location 716. However, if a user of the requesting client device rewinds the media data item to a location prior to seek location 716, the requesting client device may initiate presentation of the media data item from the location prior to the seek location (if already cached at the requesting client device from a previous session) or may request and receive a target portion of the media data item corresponding to the prior location from the internet gateway server or other client device.

FIG. 8 is a diagram depicting an example cache table 800 according to one disclosed embodiment. Cache table 800 may correspond to previously described cache table 166 of FIG. 1. As shown in FIG. 8, cache table 800 comprises a record of media data chunks cached at each client device organized by the media identifier and a corresponding media data chunk identifier for each media data chunk, and a client identifier for each of the client devices. For example, cache table 800 includes four different client identifiers (CLIENT ABC, CLIENT DEF, CLIENT GHI, CLIENT JKL) corresponding to four different client devices; two different media identifiers (MEDIA UVW, MEDIA XYZ), and six different media data chunk identifiers (BYTES 1—1024, 1025-2048, and 2049-3072 of MEDIA UVW, BYTES 1—1024, 1025-2048, and 2049-3072 of MEDIA XYZ). FIG. 8 depicts how a given client device may have a number of media data chunks of a number of different media data items. FIG. 8 also depicts how two client devices may have cached the same media data chunk. If multiple client devices have cached the same media data chunk, then the internet gateway server or other suitable network device can apply an algorithm to determine which client device should be assigned to serve the media data chunk to the requesting client device. Factors in the selection of a serving client device among a number of redundant client devices having the same cached media data chunk may include: the serving load on the serving client device (e.g., the least used or accessed data cache may be utilized before the more heavily used data cache), the availability of other media data chunks cached at the serving client device (e.g., a data cache may have a different media data chunk that may be served instead of the redundant media data chunk), connection parameters (e.g., round trip time, packet error rate, etc.) between the serving client device and the requesting client device or the internet gateway server over the client-side access network (e.g., utilize the serving client device with the faster connection), among other suitable factors.

While the previous examples depict a client device requesting and receiving two target portions of a media data item from two other client devices over corresponding peer-to-peer connections, it will be appreciated that any suitable number of target portions may be requested and received by a client device from any suitable number of other client devices over corresponding peer-to-peer connections. It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A network communications system, comprising:
an internet gateway server positioned at a mobile broadband access point and configured to:
establish client-side connections between the internet gateway server and a plurality of client devices via a client-side access network forming a mobile broadband wireless access network;
enable communications between each of the client devices and corresponding server devices via the client-side access network, the internet gateway server, and a server-side wide area network;
monitor the client devices to identify a subset of the client devices that are actively connected to the internet gateway server via the client-side access network and that opt-in to accelerated transmission of media data in which the subset of client devices are utilized to cache chunks of media data requested by other client devices via peer-to-peer connections;
maintain a record at a data store of the internet gateway server of media data chunks cached at each client device of the subset of client devices actively connected to the internet gateway server, the record organized by a media identifier and a corresponding media data chunk identifier for each media data chunk, and a client identifier for each of the client devices;
receive a request from a first client device of the subset of client devices actively connected to the internet gateway server for a media data item stored at a media server device connected or connectable to the internet gateway server via the server-side wide area network;
identify a media identifier for the media data item based, at least in part, on a parameter of a URL of the request for the media data item, or based, at least in part, on a response received from the media server device;
determine that a first target portion of the media data item corresponding to at least a first media data chunk is cached at a second client device of the subset of client devices actively connected to the internet gateway server based on the media identifier and the corresponding media data chunk identifier for the first media data chunk, and the client identifier for the second client device of the record;
responsive to the request, instruct the first client device to establish corresponding peer-to-peer connections with the second client device over the client-side access network connected to the internet gateway server via the mobile broadband wireless access network, to request, and to receive the first target portion of the media data item from the second client device;
retrieve a remainder of the media data item not cached at any of the client devices actively connected to the internet gateway server based on the record, by requesting the remainder of the media data item from the media server device, and receiving the remainder of the media data item from the media server device; and
send the remainder of the media data item to the first client device.

2. The network communications system of claim 1, wherein the first client device comprises one or more of an internet enabled mobile telephone, tablet computing device, personal computer, laptop computing device, desktop computing device, internet enabled television, cable television receiver, satellite television receiver, or digital video recorder.

3. The network communications system of claim 1, wherein the internet gateway server is further configured to:

receive a confirmation message from the first client device indicating that at least the first target portion was successfully transferred over respective peer-to-peer connections between the first client device and the second client device; and
if the confirmation message is not received from the first client device within a threshold time period after instructing the first client device, then:
retrieve the first target portion of the media data item and send the first target portion of the media data item to the first client device; else
instruct the first client device to establish corresponding peer-to-peer connections with a fourth client device, to request, and to receive the first target portion of the media data item from the fourth client device.

4. The network communications system of claim 1, wherein to retrieve the remainder of the media data item, the internet gateway server is further configured to:
retrieve the entire media data item;
chunk the media data item into a plurality of chunks; and
identify those chunks that comprise the remainder of the media data item;
wherein to send the remainder of the media data item to the first client device, the internet gateway server is further configured to send those chunks to the first client device.

5. The network communications system of claim 1, wherein the Internet gateway server, prior to determining that the first target portion of the media data is cached at the second client device, is further configured to:
determine whether the first client device is authorized to receive accelerated transmission of the media data item; and
instruct the first client device to establish the corresponding peer-to-peer connections with the second client device only if the first client device is authorized to receive accelerated transmission of the media data item.

6. The network communications system of claim 1, wherein the first target portion of the media data item corresponds to a seek location of the media data item subsequent to a beginning portion of the media data item.

7. The network communications system of claim 6, wherein the Internet gateway server is further configured to:
prior to receiving the request from the first client device, preload a third portion of the media data item at the first client device by sending a third portion of the media data item to the first client device via the client-side access network, the third portion of the media data item corresponding to a beginning portion of the media data item and the first target portion of the media data item and the remainder corresponding to subsequent portions of the media data item.

8. A network communications method, comprising, at an internet gateway server positioned at a mobile broadband access point:
establishing client-side connections between the internet gateway server positioned at the mobile broadband access point and a plurality of client devices via a client-side access network forming a mobile broadband wireless access network;
enabling communications between each of the client devices and corresponding server devices via the client-side access network, the internet gateway server, and a server-side wide area network;
monitoring the client devices to identify a subset of the client devices that are actively connected to the internet gateway server via the client-side access network and that opt-in to accelerated transmission of media data in which the subset of client devices are utilized to cache chunks of media data requested by other client devices via peer-to-peer connections;

maintaining a record at a data store of the internet gateway server of media data chunks cached at each client device of the subset of client devices actively connected to the internet gateway server, the record organized by a media identifier and a corresponding media data chunk identifier for each media data chunk, and a client identifier for each of the client devices;

receiving a request from a first client device of the subset of client devices actively connected to the internet gateway server for a media data item stored at a media server device connected or connectable to the internet gateway server via the server-side wide area network;

identifying a media identifier for the media data item based, at least in part, on a parameter of a URL of the request for the media data item, or based, at least in part, on a response received from the media server device;

determining that a first target portion of the media data item corresponding to at least a first media data chunk is cached at a second client device of the subset of client devices actively connected to the internet gateway server based on the media identifier and the corresponding media data chunk identifier for the first media data chunk, and the client identifier for the second client device of the record;

determining that a second target portion of the media data item is cached at a third client device of the subset of client devices actively connected to the internet gateway server based on the media identifier and the corresponding media data chunk identifier for the second media data chunk, and the client identifier for the third client device of the record;

responsive to the request, instructing the first client device to establish corresponding peer-to-peer connections with each of the second and third client devices over the mobile broadband wireless access network connected by the internet gateway server, to request, and to receive the first and second target portions of the media data item from the second and third client devices, respectively;

initiating presentation of the first and second target portions of the media data item at the first client device;

retrieving a remainder of the media data item not cached at any of the client devices actively connected to the internet gateway server based on the record, by requesting the remainder of the media data item from the media server device, and receiving the remainder of the media data item from the media server device;

sending the remainder of the media data item to the first client device; and initiating presentation of the remainder of the media data item at the first client device.

9. The network communications method of claim 8, further comprising:

receiving a confirmation message from the first client device indicating that the first target portion and the second target portion were successfully transferred over respective peer-to-peer connections between the first client device and the second and third client devices.

10. The network communications method of claim 8, wherein retrieving the remainder of the media data item includes:

retrieving the entire media data item;

chunking the media data item into a plurality of chunks; and identifying those chunks that comprise the remainder of the media data item;

wherein sending the remainder of the media data item includes sending those chunks to the first client device.

11. The network communications method of claim 8, further comprising:

prior to determining that the first target portion of the media data item is cached at the second client device, determining whether the first client device is authorized to receive accelerated transmission of the media data item, and if so, proceeding with accelerated transmission by said instructing; and wherein said instructing the first client device further comprises instructing the first client device to display an icon indicating that transmission of the media data item is being accelerated.

12. A network communications method, comprising, at a network device forming an internet gateway server positioned at a mobile broadband access point between a first client device and a media server device in a communications network:

monitoring communications between the first client device and the media server device to identify a media identifier contained within or indicated by one or more of a request message for a media data item from the first client device directed to the media server device, or a response message for the request from the media server device directed to the first client device;

intercepting the response message from the media server device;

maintain a record at a data store of the network device of media data chunks cached at client devices actively connected to the network device via a client-side access network forming a mobile broadband wireless access network, the record organized by a media identifier and a corresponding media data chunk identifier for each media data chunk, and a client identifier for each client device actively connected to the network device and that opt-in to accelerated transmission of media data in which the subset of client devices are utilized to cache chunks of media data requested by other client devices via peer-to-peer connections;

modifying an object reference to a first target portion of the media data item in the response message from a network address of the media server device to a network address of a second client device identified in the record by a corresponding client identifier to enable the first client device to establish a peer-to-peer connection with the second client device over the mobile broadband wireless access network of the network device, and to enable the first client device to request and to receive the first target portion of the media data item identified in the record by a corresponding media identifier and a corresponding media data chunk identifier from the second client device via the peer-to-peer connection over the mobile broadband wireless access network; and facilitating delivery of a remainder of the media data item to the first client device from one or more of the media server device, a third client device via another peer-to-peer connection over the mobile broadband wireless access network, or the network device based on the record;

wherein the first target portion of the media data item corresponds to a seek location of the media data item subsequent to a beginning portion of the media data item.

* * * * *